United States Patent
Dwyer et al.

(10) Patent No.: US 10,180,445 B2
(45) Date of Patent: Jan. 15, 2019

(54) REDUCING BIAS IN AN ACCELEROMETER VIA CURRENT ADJUSTMENT

(71) Applicant: Honeywell International Inc., Morris Plains, NJ (US)

(72) Inventors: Paul W. Dwyer, Seattle, WA (US); Arthur Savchenko, Krikland, WA (US)

(73) Assignee: Honeywell International Inc., Morris Plains, NJ (US)

( * ) Notice: Subject to any disclaimer, the term of this patent is extended or adjusted under 35 U.S.C. 154(b) by 250 days.

(21) Appl. No.: 15/176,704

(22) Filed: Jun. 8, 2016

(65) Prior Publication Data

US 2017/0356927 A1  Dec. 14, 2017

(51) Int. Cl.
*G01P 15/125* (2006.01)
*G01P 15/13* (2006.01)

(52) U.S. Cl.
CPC .......... *G01P 15/125* (2013.01); *G01P 15/132* (2013.01)

(58) Field of Classification Search
CPC ...... G01P 15/125; G01P 15/13; G01P 15/131; G01P 15/132
USPC ............ 73/1.38, 1.39, 514.18, 514.32
See application file for complete search history.

(56) References Cited

U.S. PATENT DOCUMENTS

| | | | |
|---|---|---|---|
| 3,124,962 A * | 3/1964 | Hirtreiter | G01P 15/132 310/90.5 |
| 3,498,138 A | 3/1970 | Stewart | |
| 4,320,669 A | 3/1982 | Grohe | |
| 4,679,434 A | 4/1987 | Stewart | |
| 4,944,184 A * | 7/1990 | Blake | G01P 15/125 73/514.23 |
| 5,111,694 A | 5/1992 | Foote | |
| 5,220,831 A | 6/1993 | Lee | |
| 5,331,852 A | 7/1994 | Greiff et al. | |
| 5,488,862 A | 2/1996 | Neukermans et al. | |
| 5,488,865 A | 2/1996 | Peters | |
| 5,756,896 A | 5/1998 | Schendel | |
| 6,318,176 B1 | 11/2001 | McKenzie et al. | |
| 6,701,786 B2 | 3/2004 | Hulsing, II | |

(Continued)

FOREIGN PATENT DOCUMENTS

| | | |
|---|---|---|
| EP | 2075548 A1 | 1/2009 |
| WO | 9707405 A1 | 2/1997 |

OTHER PUBLICATIONS

Wiak et al., "Numerical modeling of 3-D comb drive electrostatic accelerometers structure (method of levitation force reduction)," XX Symposium in Electromagnetic Phenomena in Nonlinear Circuits, Emerald Group Publishing, May 2009, 10 pp.

(Continued)

*Primary Examiner* — Lisa Caputo
*Assistant Examiner* — Irving A Campbell
(74) *Attorney, Agent, or Firm* — Shumaker & Sieffert, P.A.

(57) ABSTRACT

An accelerometer includes a first stator, a second stator, a proof mass assembly disposed between the first stator and second stator, and a controller. The first stator includes a first magnet and the second stator includes a second magnet. The proof mass assembly includes a first coil configured to receive a first amount of current and a second coil configured to receive a second amount of current. The controller is configured to distribute the first amount of current to the first coil and the second amount of current to the second coil. The first amount of current is different than the second amount of current.

20 Claims, 6 Drawing Sheets

(56) References Cited

U.S. PATENT DOCUMENTS

| | | |
|---|---|---|
| 7,128,032 B2 | 10/2006 | Froeschle et al. |
| 8,265,287 B2 | 9/2012 | Kageyama |
| 8,516,886 B2 | 8/2013 | Acar et al. |
| 8,664,951 B2 | 3/2014 | Johnson et al. |
| 2015/0177272 A1 | 6/2015 | Clark |

OTHER PUBLICATIONS

Search Report from counterpart European Application No. 17158787.6-1568, dated Apr. 18, 2017, 5 pp.

Response to Form 1507N dated Apr. 18, 2017 from counterpart European Application No. 17158787.6-1568, filed Apr. 20, 2017, 1 pp.

Notice of Intent to Grant and Text Intended to Grant from counterpart European Application No. 17158787.6, dated Apr. 16, 2018, 42 pp.

* cited by examiner

REDUCING BIAS IN AN ACCELEROMETER VIA CURRENT ADJUSTMENT

STATEMENT REGARDING FEDERALLY SPONSORED RESEARCH OR DEVELOPMENT

This invention was made with Government support under a Classified Government Contract Number awarded by a Classified Sponsoring Agency. The Government has certain rights in the invention.

TECHNICAL FIELD

The disclosure relates to accelerometers.

BACKGROUND

Accelerometers function by detecting the displacement of a proof mass under inertial forces. An accelerometer assembly may, for example, detect the displacement of a proof mass by a capacitive pick-off system. In this example, a capacitor pick-off plate may be deposited on the upper surface of the proof mass, and a similar capacitor pick-off plate may be deposited on the lower surface of the proof mass. The capacitor plates cooperate with the inwardly facing surfaces of upper and lower stators to provide the capacitive pick-off system. Additionally, a force rebalance system may be used to detect the displacement of the proof mass, where coil forms with force rebalance coils are mounted on either side of the proof mass. The force rebalance coils cooperate with permanent magnets in the upper and lower stators and with a suitable feedback circuit to retain the proof mass at a predetermined position (i.e., a null position) with respect to the support structure. Acceleration applied to the accelerometer assembly may be determined based on the change in capacitance with respect to the capacitor pick-off plates or the current increase in the force rebalance coils to maintain the proof mass in the null position.

SUMMARY

In one example, an accelerometer may include a first stator, a second stator, a proof mass assembly disposed between the first stator and second stator, and a controller. The first stator may include a first magnet and the second stator may include a second magnet. The proof mass assembly may include a first coil configured to receive a first amount of current and a second coil configured to receive a second, different amount of current. The controller may be configured to distribute the first amount of current to the first coil and the second, different amount of current to the second coil.

In another example, a method includes distributing, by a controller of an accelerometer, a first amount of current to a first coil and a second, different amount of current to a second coil. A first stator of the accelerometer may include a first magnet and a second stator of the accelerometer comprises a second magnet. A proof mass assembly of the accelerometer may be disposed between the first stator and second stator and may include the first coil and the second coil.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
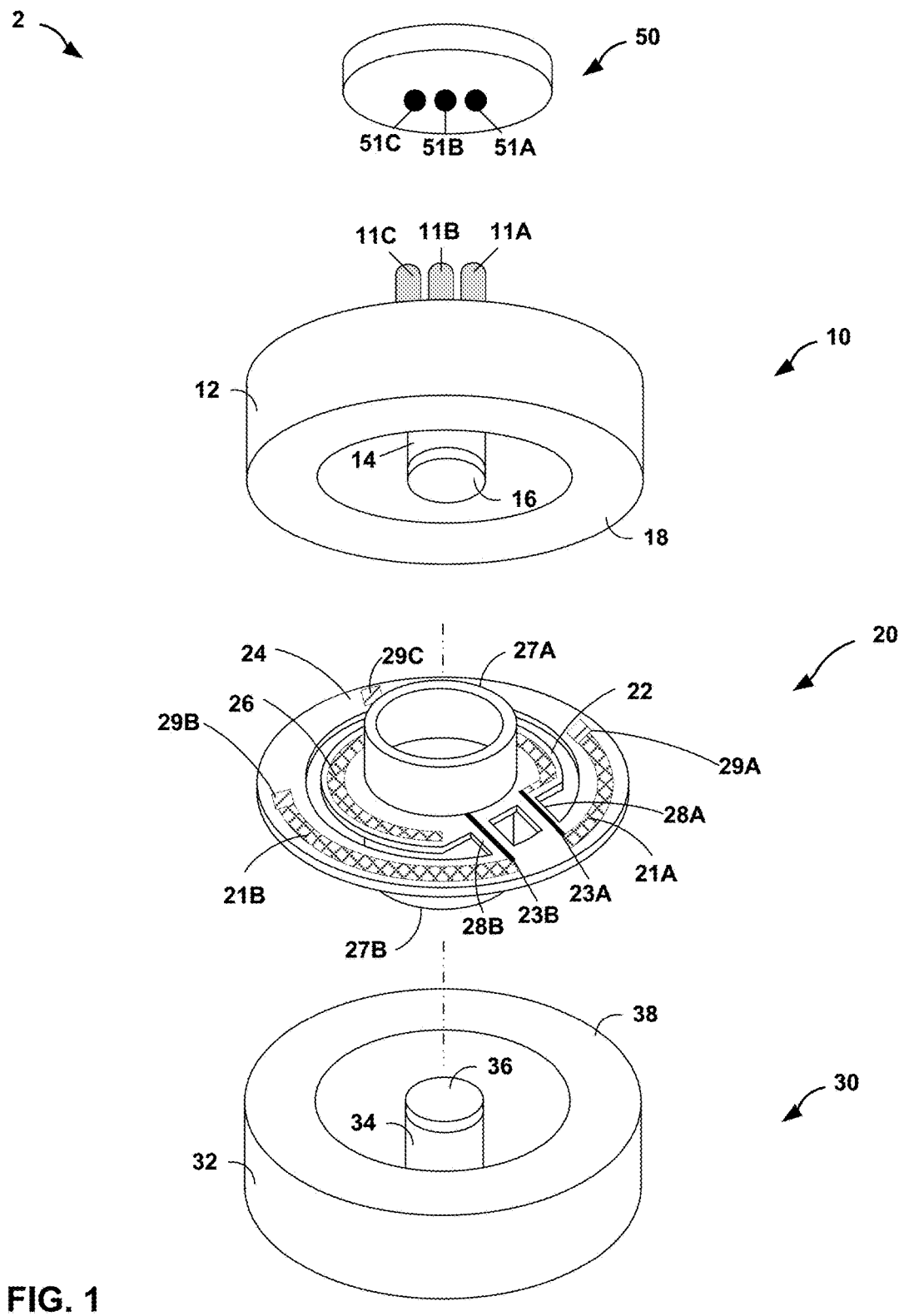
FIG. 1 is a conceptual diagram illustrating an exploded view of an example accelerometer.

Navigation systems and positioning systems rely on the accuracy of accelerometers to perform operations. Hysteresis (i.e., the inability to return to a null position) in accelerometers may cause errors to accumulate in the location or positional information of the systems which can compromise the operations of the systems. An accelerometer assembly measures acceleration of the accelerometer itself with respect to an inertial reference frame. An accelerometer assembly with stators (e.g., magnetic structures) above and below the accelerometer may form a capacitive pick-off system. For example, as the proof mass is displaced by acceleration of the accelerometer assembly, the change in capacitance of the capacitor plates on the top and bottom of the proof mass can be used by the accelerometer assembly to determine the displacement of the proof mass. The amount of displacement of the proof mass from a null position may be proportionate to the magnitude of the acceleration incident upon the accelerometer. Additionally or alternatively, the accelerometer assembly with stators above and below the accelerometer and force rebalance coils located on either side of the proof mass may form a force rebalance system. For example, the force from the acceleration of the accelerometer assembly will attempt to displace the proof mass. The current in the force rebalance coils will be increased by a servo to maintain the null position of the proof mass by driving the differential capacitance from the pick-offs to zero. The current increase in the force rebalance coils provides the opposite force required for maintaining the null position of the proof mass, and the increase in current will be proportional to the applied acceleration.

In some examples, a controller may distribute the current to the force rebalance coils equally. For example, the controller may distribute all of the overall current to an upper force rebalance coil, which interacts with a magnet in the upper stator, and the same current to a lower force rebalance coil, which interacts with a magnet in the lower stator. As the accelerometer experiences acceleration, the controller may change the current that is distributed to the force rebalance coils. If the minor loop slope of the magnet in the upper stator is equal to the minor loop slope of the magnet in the lower stator and the change in the same current is distributed to the upper coils and lower coils, a change in the magnetic flux generated by the upper magnet will be equal in magnitude to a change in the magnetic flux generated by the lower magnet. However, if the minor loop slopes are not equal and the controller distributes the same current to both of the force rebalance coils, a change in the current will cause an increase in the magnetic flux of one magnet that is not equal to the decrease in the magnetic flux of the other magnet. As a result, a scale factor (e.g., a factor or a function that establishes the size of the electrical output signal for a given input acceleration experienced by the accelerometer) of the accelerometer may change. If the scale factor changes, the accelerometer may incorrectly determine the acceleration.

The disclosure describes techniques for distributing different amounts of current to the upper force rebalance coils and the lower force rebalance coils when the upper magnet has a different minor loop slope than the lower magnet. The force rebalance coils may receive the current and may interact with the magnets to cause a change in the magnetic flux generated by each magnet. By distributing different amounts of current to the force rebalance coils, the change in magnetic flux in one magnet may be equal, or nearly equal, in magnitude (and opposite in direction) to the change in magnetic flux of the other magnet. As a result, the scale factor of the accelerometer may remain unchanged. By maintaining the scale factor, the described techniques may reduce the bias of the accelerometer, which may enable the accelerometer to more accurately determine the acceleration.

FIG. 1 is a conceptual diagram illustrating an exploded view of an example accelerometer 2 (e.g., a force rebalance accelerometer) including an upper stator 10, a lower stator 30 (e.g., collectively "upper and lower stators 10 and 30"), a proof mass assembly 20 disposed between upper and lower stators 10 and 30, and a controller 50. In some examples, proof mass assembly 20 may include a proof mass 22, a support structure 24, and a first flexure 28A and a second flexure 28B (collectively, "flexures 28") flexibly connecting proof mass 22 to support structure 24. Proof mass 22 may include an upper and lower capacitance pick-off plates (only upper capacitance pick-off plate 26 is shown in FIG. 1) and an upper force rebalance coil 27A and lower force rebalance coil 27B (collectively, force rebalance coils 27) mounted on the major surfaces of proof mass 22 and configured to interact with upper and lower stators 10 and 30.

Support structure 24 of proof mass assembly 20 may provide structural support for proof mass 22 and help maintain the separation between proof mass 22 and upper and lower stators 10 and 30. In some examples, support structure 24 may define a plane in which proof mass 22 and flexures 28 are located. For example, as shown in FIG. 1, support structure 24 may be in a form of a planar ring structure that substantially surrounds proof mass 22 and substantially maintains flexures 28 and proof mass 22 in a common plane. Although support structure 24 as shown in FIG. 1 is a circular shape, it is contemplated that support structure 24 may be any shape (e.g., square, rectangular, oval, or the like) and may or may not surround proof mass 22. Support structure 24 may be formed using any suitable material. In some examples, support structure 24 may be made of fused quartz (SiO2). In other examples, support structure 24 may be made of a silicon material.

Support structure 24 may also include one or more mounting pads such as mounting pads 29A-29C (collectively, "mounting pads 29") positioned at various locations on support structure 24. In some examples, mounting pads 29 may be raised such that when accelerometer 2 is fully assembled, mounting pads 29 may contact upper and lower stators 10 and 30 to separate proof mass assembly 20 from upper and lower stators 10 and 30 as well as provide mounting support for proof mass assembly 20. Mounting pads 29 may take on any form or shape and may be present in any quantity. In some examples, the height of mounting pads 29 may define the capacitive gaps between upper and lower stators 10 and 30 and the upper and lower capacitance pick-off plates (e.g., upper capacitance pick-off plate 26) on proof mass 22. In some examples, the height of mounting pads 29 may be between half of one-thousandth to one-thousandth of an inch. In some examples, mounting pads 29 may be on both sides of support structure 24.

In some examples, mounting pads 29 may be configured to help relieve forces and/or strains arising from TEC mismatches between upper and lower stators 10 and 30 and support structure 24 of proof mass assembly 20. For example, mounting pads 29 may be configured to mechanically isolated portions of proof mass assembly 20 from forces and/or strains caused during construction of accelerometer 2 (e.g., through the use of cutaways to mechanically isolate mounting pads 29 from support structure 24). In some examples, mounting pads 29 may provide frictional forces to upper and lower stators 10 and 30 and/or help prevent the stators from shifting or slipping during construction or operation of accelerometer 2. In some examples, mounting pads 29 are made of fused quartz ($SiO_2$). In other examples, mounting pads 29 are made of a silicon material.

In some examples, support structure 24 may also include a plurality of electrical traces 21A-21B (collectively, "electrical traces 21"). In some examples electrical traces 21 may be formed on a single surface of support structure 24 (e.g., upper surface) or on multiple surfaces (e.g., upper, lower, and side surfaces) of support structure 24. Electrical traces 21A and 21B may electrically communicate with respective electrical traces 23A-23B (collectively, "electrical traces 23") to transmit an electrical signal. In some examples electrical traces 21 may be electrically connected to upper and lower stators 10 and 30 (e.g., via electrical bonding pads or mounting pads 29) to establish electrical connections with other components, including additional circuitry, of accelerometer 2 or to other devices in which accelerometer 2 is installed.

Electrical traces 21 may be formed using any suitable conductive material. In some examples, the composition of electrical traces 21 may be selected to exhibit good thermal expansion coefficient (TEC) compatibility with the base material of support structure 24 as well as demonstrate relatively low electrical resistivity. For example, electrical traces 21 may be formed from a layer of chromium plated with a layer of gold. In such examples, the layer of chromium may provide relatively good adhesion to the base material of support structure 24 (e.g., quartz) while the layer of gold provides low electrical resistivity and a sufficient basis for establishing other electrical connections (e.g., wire bonds). Electrical traces 21 may be formed using any suitable technique. For example, portions of support structure 24 may be masked to define electrical traces 21 followed by deposition of a conductive material using, for example, chemical vapor deposition, physical vapor deposition (e.g., electron beam evaporation or sputtering), or the like.

Mounting pads 29 may be configured to electrically connect components and circuitry of proof mass assembly 20 with other components, including additional circuitry, of accelerometer 2. For example, electrical traces 21A and 21B may be deposited on a portion of mounting pads 29A and 29B, respectively. When upper and lower stators 10 and 30 are mounted to opposite sides of proof mass assembly 20, electrical traces 21 may establish an electrical connection with upper and lower stators 10 and 30 through the contact points on mounting pads 29.

Proof mass assembly 20 also includes proof mass 22, which may include one or more capacitance pick-off plates (e.g., upper capacitance pick-off plate 26) and one or more force rebalance coils (e.g., force rebalance coils 27) mounted on an upper and/or lower surfaces of proof mass 22. While the disclosure describes the operation of an accelerometer in terms of upper capacitance pick-off plate 26, such descriptions may equally apply to the use of a lower capacitance pick-off plate or a combination of upper and lower capacitance pick-off plates. Other means of measuring the deflection of proof mass 22 due to acceleration are also contemplated by this disclosure.

In some examples, upper capacitance pick-off plate 26 and upper force rebalance coil 27A may be configured to interact with upper stator 10 to measure the acceleration applied to accelerometer 2. For example, during operation as acceleration is applied to accelerometer 2, proof mass 22 may deflect from a null position causing the capacitance gap between upper capacitance pick-off plate 26 and the inwardly facing surface of upper stator 10 to change (e.g., increase or decrease) resulting in a change in a capacitance measurement. In some examples, the change in capacitance may be used to determine the amount of acceleration applied to accelerometer 2. Additionally or alternatively, accelerometer 2 may be configured to apply an electrical current to upper force rebalance coil 27A based on the change in capacitance such that upper force rebalance coil 27A in conjunction with an magnetic pole piece of upper stator 10 acts as a servo to maintain the position proof mass 22 at a null position. In such examples, the current applied to upper force rebalance coil 27A to maintain proof mass 22 at the null is proportional to and may be used to determine the amount of acceleration applied to accelerometer 2. Similarly, a lower capacitance pick-off plate and lower force rebalance coil 27B may interact with lower stator 30 to measure the acceleration applied to accelerometer 2.

In some examples, force rebalance coils 27 may be attached to an upper or lower surface of proof mass 22. Force rebalance coils 27 may be formed, for example, from of a copper coil and attached to one of the respective surfaces of proof mass 22 using suitable techniques. In some examples, force rebalance coils 27 may include a coil form (e.g., anodized aluminum form) that provides additional support for the coil. In such examples, the coil form may be mounted directly to the surface of proof mass 22 using, for example, a compliant elastomer. The compliant elastomer may help alleviate possible TEC mismatches between the coil form and base materials of proof mass 22. Force rebalance coils 27 may be electrically connected to other electronic components of accelerometer 2 through one or more electrical traces (e.g., electrical trace 23B on flexure 28B).

Proof mass 22 also includes upper capacitance pick-off plate 26 formed on the upper surface of proof mass 22. In some examples, upper capacitance pick-off plate 26 may cooperate with the inwardly facing surface of upper stator 10 to provide a capacitive pick-off system. Upper capacitance pick-off plate 26 may be electrically connected to other electronic components of accelerometer 2 through one or more electrical traces (e.g., electrical trace 23A on flexure 28A).

Upper capacitance pick-off plate 26 may be formed using any suitable technique. For example, portions of proof mass 22 may be masked to define upper capacitance pick-off plate 26 followed by deposition of a conductive material using, for example, chemical vapor deposition, physical vapor deposition (e.g., electron beam evaporation or sputtering), or the like. In some examples, upper capacitance pick-off plate 26 may include a layer of chromium formed on the surface of proof mass 22 followed by a layer of gold formed on the layer of chromium. In some examples, upper capacitance pick-off plate 26 may be formed simultaneously with electrical traces 21 using the same conductive materials. In other examples, upper capacitance pick-off plate 26 may be formed separately from electrical traces 21 using the same or different conductive materials. While, upper capacitance pick-off plate 26 is depicted as a c-shaped capacitor pick-off plate, it is contemplated that upper capacitance pick-off plate 26 may take the form of any suitable shape configured to measure a capacitance with upper stator 10.

Proof mass 22 may be flexibly connected to support structure 24 using one or more flexures 28. In some examples, flexures 28 may support proof mass 22 within support structure 24 and enable proof mass 22 to move about the plane defined by support structure 24. For example, flexures 28 may be stiff in the radial direction (e.g., in the x-axis and y-axis directions) and flexible in vertical direction (e.g., in z-axis direction), such that flexures 28 allow proof mass 22 to move in a direction substantially orthogonal (e.g., orthogonal or nearly orthogonal) to a plane defined by support structure 24 due to acceleration of accelerometer 2.

Flexures 28 may be formed from any suitable base material. For example, flexures 28 may be made of quartz ($SiO_2$). In other examples, flexures 28 may be made of a silicon material. In some examples, flexures 28 may be formed using the same base material as support structure 24 and proof mass 22, such that the three components are formed from a monolithic material (e.g., a single structure). For example, proof mass 22, flexures 28, and support structure 24 may be made from the same silicon material or fused quartz. In such examples, the plurality of features defining proof mass 22, flexures 28, and support structure 24 of proof mass assembly 20 may be etched into the monolithic material using, for example, a carbon-dioxide laser or acid bath to define the base features for proof mass assembly 20. For example, in some examples, the base material for proof mass 22, flexures 28, and support structure 24 may consist essentially of fused quartz or silicon (e.g., made of primarily fused quartz or silicon) in the form a monolithic material. The monolithic material may be covered with a photoresist masking to define the various features of proof mass 22, support structure 24, and flexures 28 and the monolithic material may be exposed to laser light to remove (e.g., vaporize) excess material and form the various structural features proof mass 22, support structure 24, and flexures 28. In some examples, the base features of proof mass assembly 20 may be formed from the monolithic material by masking the monolithic material with a silk screen vinyl material or a silicon rubber material followed by submersion of the monolithic material in an acid bath to etch away excess materials.

In some examples, flexures 28 may be relatively thin (e.g., thin relative to support structure 24 and proof mass 22) in a direction defining the motion of proof mass 22. In some examples, flexures 28 may define a thickness in a direction substantially orthogonal (e.g., orthogonal or nearly orthogonal) to a plane defined by support structure 24 of about 0.25 to about 1 millimeters.

Flexures 28A and 28B may include one or more respective electrical traces 23A and 23B configured to transmit electrical signals across flexures 28 of proof mass assembly 20 and between components on support structure 24 and proof mass 22. In some examples, electrical traces 23 may be formed on a single surface of a respective flexure of flexures 28 (e.g., upper surface) or may be formed on multiple surfaces of flexures 28 (e.g., upper and lower surfaces). Electrical traces 23 may act as an electrical bridge electrically connecting components including circuitry positioned on proof mass 22 (e.g., upper capacitance pick-off plate 26) and other components, including additional circuitry, positioned on support structure 24 (e.g., electrical traces 21). In some examples, electrical traces 23 may be formed using similar materials and techniques as electrical traces 21.

In some examples, upper and lower stators 10 and 30 may be attached to (e.g., clamped) to opposite sides of proof mass assembly 20 using one or more of the respective mounting pads 29. In some examples, upper and lower stators 10 and 30 may be secured to proof mass assembly 20 using a bellyband (not shown). In such examples, the bellyband may be formed from a single metal hoop-like structure that surrounds the exterior of upper and lower stators 10 and 30. The belly band may be fixed to upper and lower stators 10 and 30 using, for example, an epoxy, thereby securing upper and lower stators 10 and 30 after they are clamped to proof mass assembly 20.

In some examples, each of upper and lower stators 10 and 30 may include an excitation ring, permanent magnet, and pole piece. For example, as illustrated in FIG. 1, upper stator 10 includes excitation ring 12, upper permanent magnet 14, and pole piece 16 and lower stator 30 includes excitation ring 32, lower permanent magnet 34, and pole piece 36. Each excitation ring may include an inwardly facing surface (e.g., inwardly facing surface 18 and 38) that faces proof mass assembly 20. Inwardly facing surfaces 18 and 38 of the respective upper stator 10 and lower stator 30 may interact with (e.g., may be coupled to) portions of proof mass assembly 20. For example, inwardly facing surface 18 of upper stator 10 may interact with an upper surface of proof mass assembly 20 and inwardly facing surface 38 of lower stator 30 may interact with a lower surface of proof mass assembly 20. Each of excitation rings 12 and 32 may be made from any suitable material including, for example, invar, super invar, or the like. Invar has a relatively low TEC of about 2 parts-per-million (ppm) per degree centigrade (° C.), which may improve compatibility aspects between upper and lower stators 10 and 30 and the base materials used to form proof mass assembly 20 (e.g., fused quartz which has a TEC of about 0.55 ppm/° C.). In some examples, a first end of each permanent magnet may be coupled to a respective excitation ring and a second end of each permanent magnet may be coupled to the pole piece. In some examples, at least one of stators 10 or 30 may include a plurality of electrical pins. For example, as illustrated in FIG. 1, upper stator 10 includes electrical pins 11A-11C (collectively, "electrical pins 11"). While shown with three electrical pins 11, upper stator 10 may include additional or fewer electrical pins 11. Electrical pins 11 may be coupled to controller 50 and may transmit electrical signals between controller 50 and upper stator 10, proof mass assembly 20, lower stator 30, or any combination therein.

Accelerometer 2 may include controller 50. Controller 50 may include at least one processor. The at least one processor may include one or more digital signal processors (DSPs), general purpose microprocessors, application specific integrated circuits (ASICs), field programmable logic arrays (FPGAs), or other equivalent integrated or discrete logic circuitry, or combinations thereof. The functions attributed to the controllers and processors described herein may be provided by a hardware device and embodied as software, firmware, hardware, or any combination thereof. In some examples, controller 50 may include through-holes 51A-51C (collectively, "through-holes 51"). Through-holes 51 may receive electrical pins 11 of upper stator 10 such that controller 50 may transmit electrical signals to, and receive electrical signals from, upper stator 10, proof mass assembly 20, lower stator 30, or any combination therein.

Controller 50 may be configured to maintain proof mass 22 at the null position when the accelerometer experiences acceleration. For example, the force from the acceleration of the accelerometer will attempt to displace proof mass 22. Controller 50 may distribute current to force rebalance coils 27 such that force rebalance coils 27 may interact with upper permanent magnet 14 and lower permanent magnet 34 to provide the opposite force required for maintaining the null position of proof mass 22. By causing proof mass 22 to return to the null position, controller 50 may drive the differential capacitance from the pick-offs to zero.

Controller 50 may be configured to distribute current to force rebalance coils 27. For example, controller 50 may distribute a first amount of current to upper force rebalance coil 27A and a second amount of current to lower force rebalance coil 27B. For example, controller 50 may distribute half of the current to upper force rebalance coil 27A 14 and half of the current to lower force rebalance coil 27B. In these examples, if the minor loop slope associated with upper permanent magnet 14 is equal to the minor loop slope associated with lower permanent magnet 34, the current flow through upper force rebalance coil 27A may cause the magnetic flux generated by upper permanent magnet 14 to change (e.g., increase) by an amount equal in magnitude and opposite in sign to the change (e.g., decrease) in the magnetic flux generated by lower permanent magnet 34 as a result of the current flow through lower force rebalance coil 27B. Thus, the net change in the magnetic flux may be equal to zero and the scale factor may remain unchanged.

However, in some examples, the minor loop slope associated with upper permanent magnet 14 is not equal to the minor loop slope associated with lower permanent magnet 34. In these examples, if the current flow through upper force rebalance coil 27A is equal to the current flow through lower force rebalance coil 27B, the magnitude of the change in magnetic flux generated by upper permanent magnet 14 may not be equal to the magnitude of the change in magnetic flux generated by lower permanent magnet 34. If the change in magnetic flux for the respective permanent magnets 14, 34 is not equal, the net change in the magnetic flux does not equal zero and the scale factor may change as accelerometer 2 experiences acceleration.

In some examples, controller 50 may be configured to distribute current to force rebalance coils 27 unequally. In other words, the amount of current applied to upper force rebalance coil 27A may be different than the amount of current applied to lower force rebalance coil 27B. For instance, controller 50 may distribute a first amount of current to upper force rebalance coil 27A and may distribute a second, different amount of current to lower force rebalance coil 27B. In some examples, controller 50 may include a resistor connected in series to the force rebalance coil 27 that is associated with the permanent magnet having the larger minor loop slope. For example, if the minor loop slope associated with the upper permanent magnet 14 is greater than the minor loop slope associated with the lower permanent magnet 34, controller 50 may include a resistor coupled in series to upper force rebalance coil 27A in order to distribute less current to upper force rebalance coil 27A relative to the amount of current controller 50 distributes to lower force rebalance coil 27B. Similarly, if the minor loop slope associated with lower permanent magnet 34 is greater than the minor loop slope associated with the upper permanent magnet 14, controller 50 may include a resistor coupled in series to lower force rebalance coil 27B in order to distribute less current to lower force rebalance coil 27B relative to the amount of current controller 50 distributes to upper force rebalance coil 27A.

By distributing different amounts of current to upper force rebalance coil 27A and lower force rebalance coil 27B when upper permanent magnet 14 and lower permanent magnet 34 have different minor loop slopes, the change in magnetic flux generated by upper permanent magnet 14 may be equal in magnitude and opposite in sign to the change in magnetic flux generated by lower permanent magnet 34. Thus, the net change in magnetic flux may be equal, or nearly equal, to zero when accelerometer 2 experiences acceleration. By causing the net change in magnetic flux to be equal, or nearly equal, to zero, controller 50 may reduce or eliminate the change in scale factor when accelerometer 2 experiences acceleration, which may enable controller 50 to more accurately determine the acceleration.

Figure 2B:
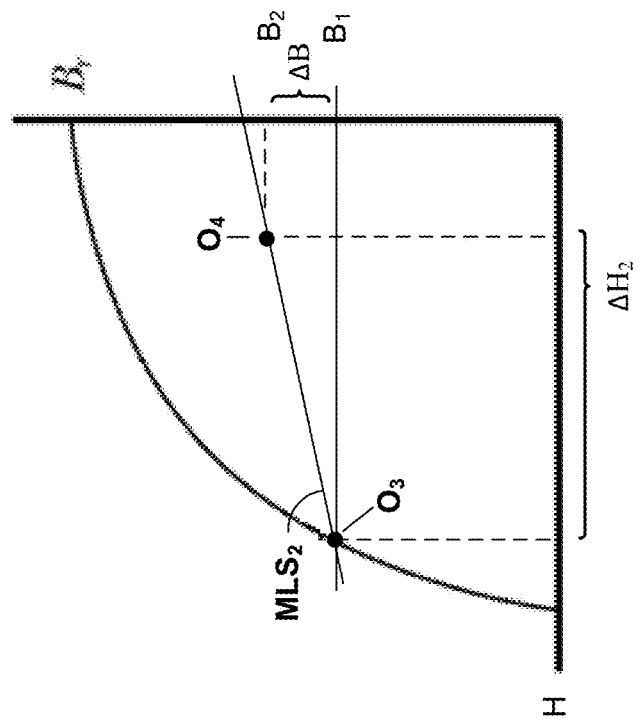
FIGS. 2A-2B are graphs illustrating example BH curves corresponding to example magnets of an example accelerometer.
Figure 2A:
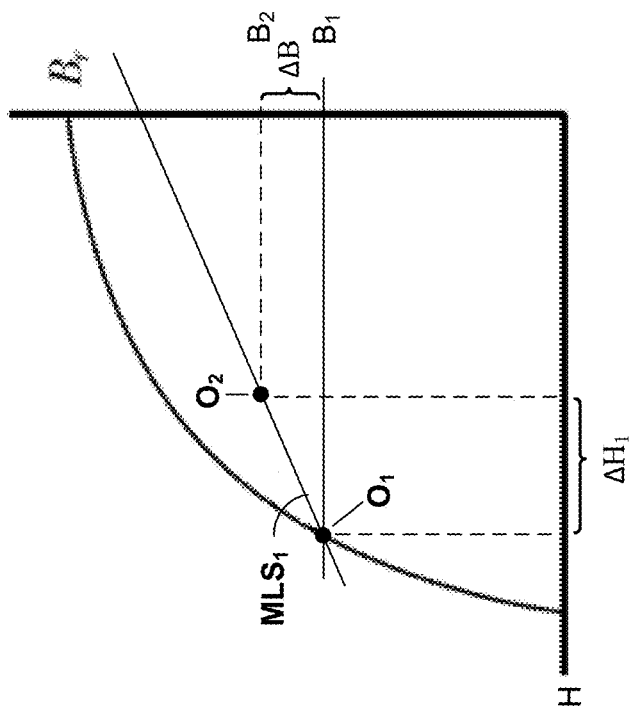

FIGS. 2A-2B are graphs illustrating example BH curves corresponding to example magnets of an example accelerometer. FIG. 2A illustrates a BH curve corresponding to a magnet having a first minor loop slope $MLS_1$. FIG. 2B illustrates a BH curve corresponding to a magnet having a second minor loop slope $MLS_2$. For purposes of illustration only, the magnet characterized by the BH curve illustrated in FIG. 2A will be described with reference to upper permanent magnet 14 as shown in FIG. 1, and the magnet characterized the by BH curve illustrated in FIG. 2B will be described with reference to lower permanent magnet 34 as shown in FIG.

In some examples, when accelerometer 2 of FIG. 1 is at rest, upper permanent magnet 14 may operate at point $0_1$ on the BH curve and lower permanent magnet 34 may operate at point $O_4$ on the BH curve. When accelerometer 2 experiences acceleration, controller 50 may distribute current to upper force rebalance coil 27A and lower force rebalance coil 27B in order to cause a change in the magnetic flux generated by upper permanent magnet 14 and lower permanent magnet 34. Controller 50 may distribute current to the respective force rebalance coils 27 based on the first minor loop slope $MLS_1$ associated with first permanent magnet and the second minor loop slope $MLS_2$ associated with second permanent magnet. For example, as illustrated in FIGS. 2A and 2B, minor loop slope $MLS_1$, which is associated with upper permanent magnet 14, is greater than minor loop slope $MLS_2$ associated with lower permanent magnet 34. Thus, in the examples illustrated by FIGS. 2A and 2B, to generate an equal amount of change $\Delta B$ in the magnetic flux of each permanent magnet, controller 50 may cause a greater change in the X-axis of the BH curve associated with lower permanent magnet 34 (FIG. 2B) relative to the change in the X-axis of the BH curve associated with upper permanent magnet 14 (FIG. 2A).

The change in the X-axis of the BH curve associated with upper permanent magnet 14 (FIG. 2A) may be based on the change in the current applied to the force rebalance coil associated with upper permanent magnet 14 (e.g., upper force rebalance coil 27A). Similarly, the change in the X-axis of the BH curve associated with lower permanent magnet 34 (FIG. 2B) may be based on the change in the current applied to the force rebalance coil associated with lower permanent magnet 34 (e.g., lower force rebalance coil 27B). Thus, controller 50 may distribute current to upper force rebalance coil 27A in order to cause a change in the H-axis of the BH curve associated with upper permanent magnet 14 and may distribute current to lower force rebalance coil 27B in order to cause a change in the H-axis of the BH curve associated with lower permanent magnet 34. For example, controller 50 may distribute a first amount of current to upper force rebalance coil 27A and a second, different (e.g., greater) amount of current to lower force rebalance coil 27B. As shown in FIG. 2A, distributing the first amount of current to upper force rebalance coil 27A may cause upper permanent magnet 14 to operate at point $0_2$ of the BH curve. In other words, the amount of magnetic flux generated by upper permanent magnet 14 may change by $\Delta B$, from flux level $B_1$ to flux level $B_2$. Similarly, as shown in FIG. 2B, distributing the second, different amount of current to lower force rebalance coil 27B may cause lower permanent magnet 34 to operate at point $0_3$ of the BH curve. In other words, the amount of magnetic flux generated by lower permanent magnet 34 to change $\Delta B$, from flux level $B_2$ to flux level $B_1$. Thus, the change in magnetic flux generated by upper permanent magnet 14 may be equal in magnitude and opposite in sign to the change in magnetic flux generated by lower permanent magnet 34 by applying different amounts of current (and hence moving different amounts along the X-axis of the respective BH curves) to each respective force rebalance coil associated with the respective permanent magnets.

Figure 3:
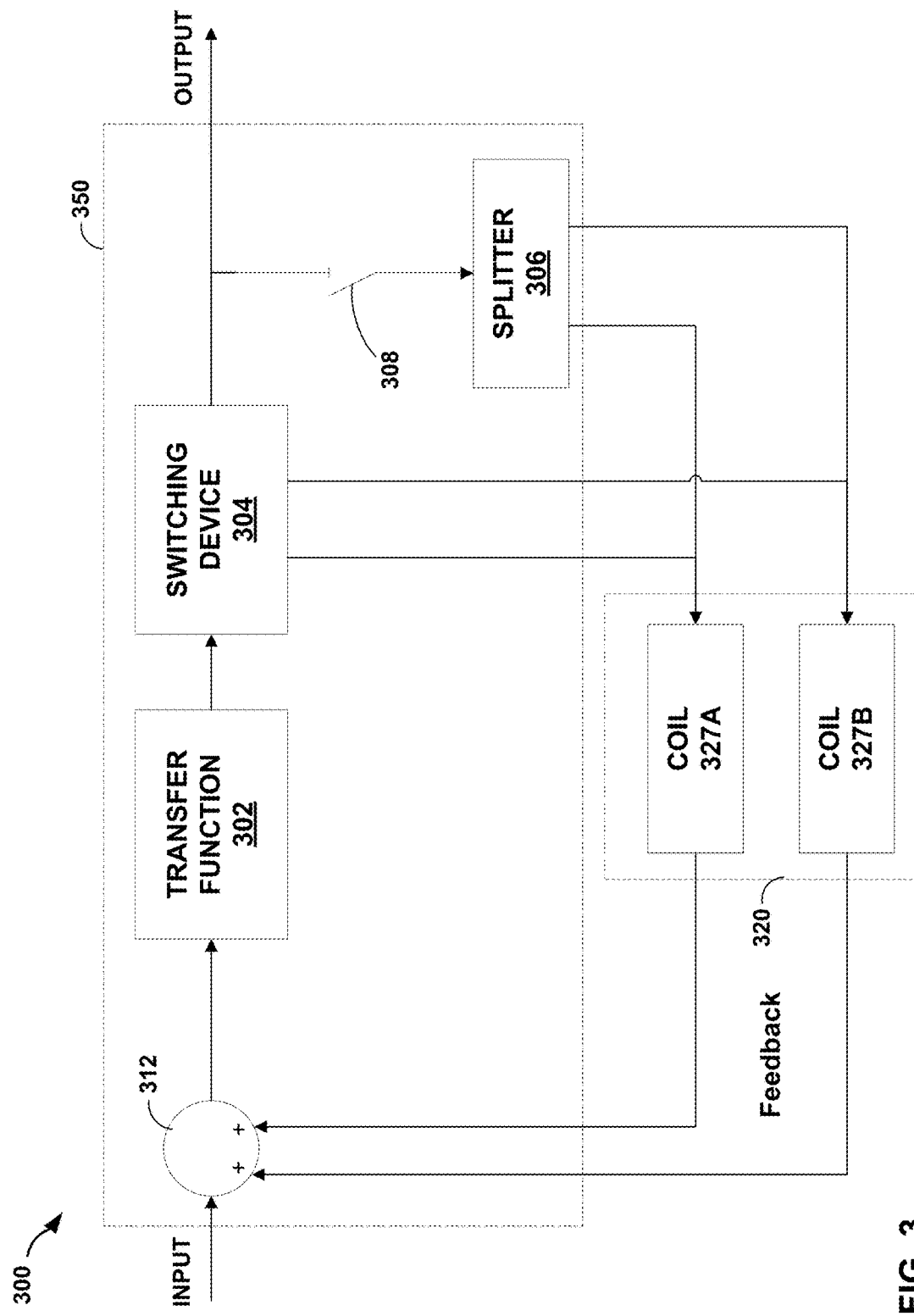
FIG. 3 is a conceptual block diagram illustrating an example accelerometer.

FIG. 3 is a conceptual block diagram illustrating an example accelerometer 300, which may correspond to accelerometer 2 of FIG. 1. Accelerometer 300 may include controller 350 and proof mass assembly 320, which may respectively correspond to controller 50 and proof mass assembly 20 of FIG. 1. Controller 350 may include transfer function 302, switching device 304, splitter 306, switch 308, and summation block 312. Proof mass assembly may include upper force rebalance coil 327A and lower force rebalance coil 327B (collectively, "force rebalance coils 327"). In some examples, accelerometer 300, controller 350, and/or proof mass assembly 320 may include additional or fewer components. For example, accelerometer 300 may include upper permanent magnet 14 and lower permanent magnet 34, as illustrated in FIG. 1. Similarly, proof mass assembly 320 may include upper and lower capacitance pick-off plates, as illustrated in FIG. 1.

In some examples, the capacitance at upper and lower capacitance pick-off plates may change when accelerometer 300 experiences an acceleration. For example, the capacitance at upper capacitance pick-off plate may increase and the capacitance at lower capacitance pick-off plate may decrease such that the capacitances are no longer equal. Controller 350 may receive an input indicating that the capacitance at the upper and lower capacitance pick-off plates are not equal. If the minor loop slopes associated with upper permanent magnet 14 and lower permanent magnet 34 are equal, controller 350 may use transfer function 302 to output an equal amount of current to upper force rebalance coil 327A and lower force rebalance coil 327B. Upper force rebalance coil 327A and lower force rebalance coil 327B may interact with upper permanent magnet 14 and lower permanent magnet 34 of FIG. 1, respectively, to generate a change in the magnetic flux and return the proof mass assembly 320 to the null position.

In some examples, the minor loop slopes associated with upper permanent magnet 14 and lower permanent magnet 34 may not be equal. Controller 350 may determine the minor loop slopes associated with each of upper permanent magnet 14 and lower permanent magnet 34. In some examples, while accelerometer 300 experiences an acceleration, controller 350 may distribute a current to a particular force rebalance coil (e.g., upper force rebalance coil 327A) that corresponds to a particular permanent magnet (e.g., the upper permanent magnet 14) and may refrain from distributing the current to the other force rebalance coil. Controller 350 may control the flow of current to force rebalance coils 327 via switching device 304 and switch 308. For instance, controller 350 may open switch 308 so that current does not flow to force rebalance coils 327 via splitter 306.

In some examples, switching device 304 includes a plurality of switches such that controller 350 may apply all of the current to upper force rebalance coil 327A by closing a switch to upper force rebalance coil 327A and may restrict current to lower force rebalance coil 327B by opening a switch coupled to lower force rebalance coil 327B. Thus, controller 350 may apply current to upper force rebalance coil 327A (which may be associated with upper permanent magnet 14) by closing a first switch of switching device 304 and may prevent current from flowing to lower force rebalance coil 327B (which may be associated with lower permanent magnet 34) by opening a second switch of switching device 304. In other examples, switching device 304 includes a single switch that may alternately couple switching device 304 to upper force rebalance coil 327A or lower force rebalance coil 327B. Thus, controller 350 may apply current to upper force rebalance coil 327A by toggling the switch from a first position to a second position, which may couple switching device 304 to upper force rebalance coil 327A and decouple switching device 304 from lower force rebalance coil 327B.

Responsive to upper force rebalance coil 327A receiving all of the current, upper force rebalance coil 327A and upper permanent magnet 14 may generate magnetic flux which may cause the proof mass to return to the null position. As the position of the proof mass changes, the capacitance of the capacitance pick-off plates may change. As the capacitance of the capacitance pick-off plate changes, an output current generated by the capacitance pick-off plates may change until the proof mass returns to the null position and the capacitance of the upper capacitance pick-off plate equals the capacitance of the lower capacitance pick-off plate. Controller 350 may receive the output current generated by the capacitance pick-off plates. Responsive to proof mass returning to the null position, controller 350 may determine the minor loop slope associated with upper permanent magnet 14. For example, controller 350 may determine the minor loop slope associated with upper permanent magnet 14 by comparing the current received by upper force rebalance coil 327A to the output current from the upper capacitance pick-off plate. For instance, controller 350 may plot the current received by upper force rebalance coil 327A versus the output current from the upper capacitance pick-off plate to determine the minor loop slope associated with upper permanent magnet 14.

In response to determining the minor loop slope associated with the particular permanent magnet (e.g., upper permanent magnet 14), controller 350 may be configured to determine the minor loop slope associated with the other permanent magnet (e.g., lower permanent magnet 34). For example, controller 350 may apply all of the current to lower force rebalance coil 327B, which may be associated with lower permanent magnet 34 while accelerometer 300 experiences an acceleration. Controller 350 may apply a current to lower force rebalance coil 327B in a manner similar to the method described above with reference to applying current to upper force rebalance coil 327A. For example, controller 350 may toggle a switch of switching device 304 from a first position to a second position to couple switching device 304 to the lower force rebalance coil 327B and decouple switching device 304 from upper force rebalance coil 327A. In other examples, controller 350 may open a first switch of switching device 304 to prevent current from flowing to upper force rebalance coil 327A and close a second switch to allow all of the current to flow to lower force rebalance coil 327B.

Responsive to lower force rebalance coil 327B receiving all of the current, lower force rebalance coil 327B and lower permanent magnet 34 may generate magnetic flux which may cause the proof mass to return to the null position. As the position of the proof mass changes, the capacitance of the capacitance pick-off plates may change. As the capacitance of the capacitance pick-off plate changes, an output current generated by the capacitance pick-off plates may change until the proof mass returns to the null position and the capacitance of the upper capacitance pick-off plate equals the capacitance of the lower capacitance pick-off plate. Controller 350 may receive the output current generated by the capacitance pick-off plates. Responsive to proof mass returning to the null position, controller 350 may determine the minor loop slope associated with lower permanent magnet 34. For example, controller 350 may determine the minor loop slope associated with lower permanent magnet 34 by comparing the current received by lower force rebalance coil 327B to the output current from the lower capacitance pick-off plate. For instance, controller 350 may plot the current received by lower force rebalance coil 327B versus the output current from the lower capacitance pick-off plate to determine the minor loop slope associated with lower permanent magnet 34.

In some examples, the minor loop slopes associated with upper permanent magnet 14 and lower permanent magnet 34 may be determined by using a BH curve tester. For instance, a BH curve tester may include coils and Hall Effect sensors that may be used to directly measure the minor loop slopes. In some examples, controller 350 may determine the ratio of the minor loop slopes associated with upper permanent magnet 14 and lower permanent magnet 34 rather than the minor loop slopes. Controller 350 may be configured to change the amount of current to upper force rebalance coil 327A and/or the amount of current to lower force rebalance coil 327B. Controller 350 may monitor the output current generated by the capacitance pick-off plates. Controller 350 may determine that the ratio of the minor loop slopes associated with upper and lower permanent magnets is equal to, or approximately equal to, the ratio of the currents that minimize the output current generated by the capacitance pick-off plates.

In some examples, controller 350 may open the one or more switches of switching device 304 and may close switch 308 so that current is routed through splitter 306. Upper force rebalance coil 327A and lower force rebalance coil 327B may be coupled in parallel via splitter 306. Splitter 306 of controller 350 may distribute a first amount of current to upper force rebalance coil 327A and a second, different amount of current to lower force rebalance coil 327B based the minor loop slope associated with upper permanent magnet 14 and the minor loop slope associated with lower permanent magnet 34. For example, if the minor loop slope associated with upper permanent magnet 14 is less than the minor loop slope associated with lower permanent magnet 34, splitter 306 may distribute more current to upper permanent magnet 14 than is distributed to lower permanent magnet 34. Similarly, if the minor loop slope associated with upper permanent magnet 14 is greater than the minor loop slope associated with lower permanent magnet 34, splitter 306 may distribute less current to upper permanent magnet 14 than is distributed to lower permanent magnet 34.

Splitter 306 may include at least one resistor (or resistor array) electrically coupled to either upper force rebalance coil 327A or lower force rebalance coil 327B. In some examples, which force rebalance coil 327 is coupled to the resistor may be based on the minor loop slopes associated with upper permanent magnet 14 and lower permanent magnet 34. For example, the resistor may be coupled to the force rebalance coil 327 associated with the respective permanent magnet having the larger minor loop slope. For instance, if the minor loop slope associated with upper permanent magnet 14 is greater than the minor loop slope associated with lower permanent magnet 34, upper force rebalance coil 327A may use less current to generate a change in the magnetic flux compared to the amount of current used by lower force rebalance coil 327B to generate the same amount of change in the magnetic flux. Thus, in this example, a resistor may be connected in series to upper force rebalance coil 327A. Splitter 306 may distribute different amounts of current to the force rebalance coils 327 based on a resistance value of the resistor. For example, because splitter 306 includes a resistor connected in series to one of force rebalancing coils 327 and does not include a resistor connected in series to the other force rebalance coil, splitter 306 may distribute a first amount of current to upper force rebalance coil 327A and a second, different amount of current to lower force rebalance coil 327B while accelerometer 300 experiences an acceleration. The greater the resistance value of the resistor, the smaller the current splitter 306 may distribute to upper force rebalance coil 327A relative to the amount of current splitter 306 distributes to lower force rebalance coil 327B.

In other examples, splitter 306 may include a first resistor (or first resistor array) having a first resistance value electrically coupled to upper force rebalance coil 327A and a second resistor (or resistor array) having a second, different resistance value electrically coupled to lower force rebalance coil 327B. In some examples, which force rebalance coil 327 is connected to the first resistor and which force rebalance coil 327 is connected to the second resistor may be based on the minor loops slopes associated with the respective permanent magnets 14, 34. For example, the resistor having the larger resistance value may be coupled to the force rebalance coil 327 associated with the respective permanent magnet having the larger minor loop slope. For instance, if the minor loop slope associated with upper permanent magnet 14 is greater than the minor loop slope associated with lower permanent magnet 34, upper force rebalance coil 327A may use less current to generate a change in the magnetic flux compared to the amount of current used by lower force rebalance coil 327B to generate the same amount of change in the magnetic flux. Thus, in this example, the first resistor may be coupled in series to upper force rebalance coil 327A and may have a larger resistance value than the second resistor coupled in series to lower force rebalance coil 327B.

Splitter 306 may distribute different amounts of current to the force rebalance coils 327 based on a resistance value of the first resistor and the second resistor. For example, because splitter 306 includes a first resistor having a first resistance value connected in series to one of force rebalancing coils 327 and a second resistor having a second, different resistance value connected in series to the other force rebalance coil, splitter 306 may distribute a first amount of current to upper force rebalance coil 327A and a second, different amount of current to lower force rebalance coil 327B while accelerometer 300 experiences an acceleration. Thus, the force rebalance coil 327 coupled to the resistor having the larger resistance value may receive less current than the force rebalance coil 327 coupled to the resistor having the smaller resistance value. As a result, splitter 306 may distribute less current to upper force rebalance coil 327A relative to the amount of current splitter 306 distributes to lower force rebalance coil 327B.

Controller 350 may include summation block 312. Summation block 312 represents the sum of the first amount of current that flows through upper force rebalance coil 327A and the second amount of current that flows through lower force rebalance coil 327B.

Figure 4:
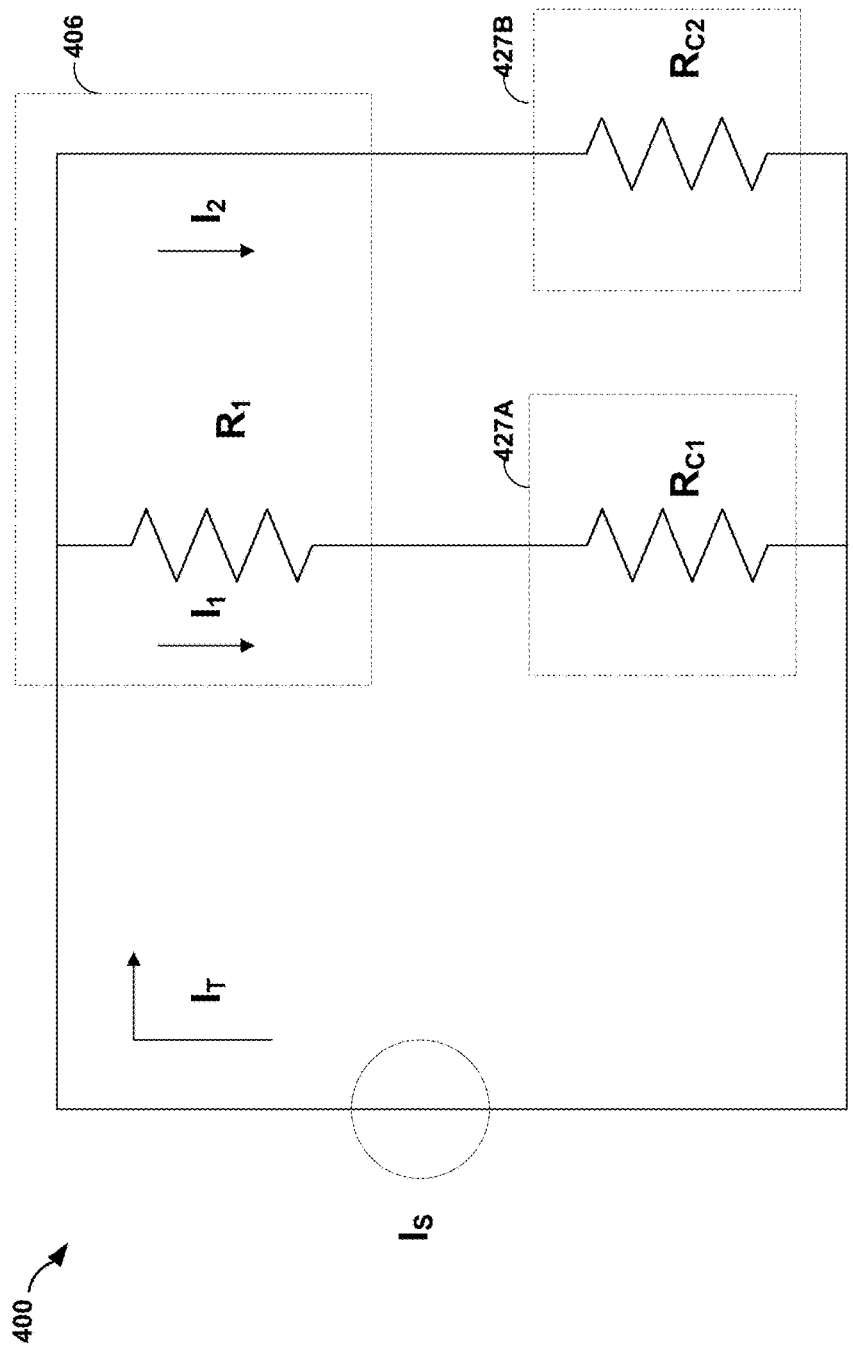
FIG. 4 is a circuit diagram illustrating an example control circuit of an example accelerometer.

FIG. 4 is a circuit diagram illustrating an example control circuit 400 of an example accelerometer. Control circuit 400 may include current source $I_S$, splitter 406, and a first force rebalance coil 427A connected in parallel to a second force rebalance coil 427B (collectively, "force rebalance coils 427"). Splitter 406 may correspond to splitter 306 of controller 350, as shown in FIG. 3. In some examples, as illustrated in FIG. 4, splitter 406 includes a resistor $R_1$ connected in series to first force rebalance coil 427A. First force rebalance coil 427A may include a resistance value indicated by $R_{C1}$ and second force rebalance coil 427B may include a resistance value indicated $R_{C2}$.

Current source $I_S$ may supply a total current $I_T$ to splitter 406. Splitter 406 may receive current $I_T$ from current source $I_S$ and may split the current into a first amount of current $I_1$ and a second amount of current $I_2$. For example, splitter 406 may distribute a first amount of current $I_1$ to first force rebalance coil 427A and a second amount of current $I_2$ to second force rebalance coil 427B. Splitter 406 may distribute the current to force rebalance coils 427 based on a resistance value of resistor $R_1$, the resistance value $R_{C1}$ of first force rebalance coil 427A, and the resistance value $R_{C2}$ of second force rebalance coil 427B. In some examples, the resistance value of resistor $R_1$ may be based on a first minor loop slope associated with first force rebalance coil 427A and a second minor loop slope associated with second force rebalance coil 427B. For example, as illustrated by the equations below, the resistance value of resistor $R_1$ may be chosen so that the ratio of the current $I_1$ to current $I_2$ is inversely proportional to the ratio of the first minor loop slope and the second minor loop slope. For instance, the ratio of the current $I_1$ to current $I_2$ may be equal, or approximately equal, to the inverse of a ratio of the first minor loop slope to the second minor loop slope, as shown by equation 1.

$$\frac{I_1}{I_2} = \frac{MLS_2}{MLS_1}. \qquad \text{EQ 1}$$

Because the voltage drop across $R_1$ and $R_{C1}$ is equal to the voltage drop across $R_{C2}$, control circuit 400 may be represented by equation 2:

$$I_1(R_1 + R_{C1}) = I_2(R_{C2}). \qquad \text{EQ2:}$$

Equation 2 can be re-written to solve for $R_1$, as shown by equation 3.

$$R_1 = \left(\frac{I_2}{I_1}(R_{C2})\right) - R_{C1}. \qquad \text{EQ 3}$$

Substituting the ratio of the first minor loop slope to the second minor loop slope for the ratio of the current $I_1$ to current $I_2$ results in equation 4.

$$R_1 = \left(\frac{MLS_1}{MLS_2} * (R_{C2})\right) - R_{C1}. \quad\text{EQ 4}$$

Therefore, resistance value of resistor $R_1$ may be calculated because $R_{C1}$ and $R_{C2}$ are known, and as discussed above with reference to FIG. 3, controller 350 may determine the minor loop slopes associated with the first permanent magnet and the second permanent magnet.

In some examples, if the $R_{C1}$=26 Ohms, $R_{C2}$=26 Ohms, and the ratio $$\frac{MLS_1}{MLS_2} = \frac{1}{0.95},$$

$R_1$ may be calculated by equation 5.

$$R_1 = \left(\frac{1}{0.95} * 26\right) - 26 \approx 1.368421 \ldots \text{Ohms.} \quad\text{EQ 5}$$

In some examples, it may not be possible to choose a resistor with a resistance value exactly equal to the resistance value $R_1$, such that the resistance value of $R_1$ may be approximated by a resistor $R_1'$. For example, in some examples, $R_1$ may be approximated by a resistor $R_1'$ having a resistance value equal to 1.37 Ohms. Substituting the resistance value $R_1'$ for $R_1$ and the resistance values for $R_1'$, $R_{C1}$ and $R_{C2}$ back into Equation 2 yields equation 6.

$$\frac{I_1}{I_2} = \frac{R_{C2}}{R_{1'} + R_{C1}} = \frac{26}{27.37}. \quad\text{EQ 6}$$

Substituting equation 6 back into equation 1 shows that:

$$\left(\frac{I_1}{I_2} = \frac{26}{27.37} \approx 0.94995\right) \approx \left(\frac{MLS_2}{MLS_1} = \frac{0.95}{1} = 0.95\right). \quad\text{EQ 7}$$

Thus, as shown by equation 7, by adding a resistor $R_1'$ in series with first force rebalance coil 427A, the ratio of the first amount of current (which is distributed to first force rebalance coil) to the second amount of current (which is distributed to second force rebalance coil) may be equal, or approximately equal (plus or minus 0.01), to the inverse of the ratio of the first minor loop slope to the second minor loop slope.

In some examples, the resistance value of resistor $R_1$ may be further based on a resistance value of at least one mounting pad 29, a resistance value of at least one electrical trace 21 or electrical trace 23, or a combination therein. For example, referring back to FIG. 1, controller 50 may be electrically coupled to upper force rebalance coil 27A via mounting pad 29B, electrical trace 21B, and electrical trace 23B. Thus, the first amount of current may flow through resistor $R_1$, mounting pad 29B, electrical trace 21B, and electrical trace 23B before reaching upper force rebalance coil 27A. Similarly, the second amount of current may flow through a mounting pad at least one electrical on the bottom surface of proof mass assembly 20 before reaching lower force rebalance coil 27B. Because the circuit including upper force rebalance coil 27A may be connected in parallel to the circuit including lower force rebalance coil 27B, the voltage drop across the circuits may be equal. Thus, in some examples, the voltage drop may be shown by equation 8, where $R_{X1}$ represents the resistance value of at least one of a mounting pad or an electrical trace and $R_{X2}$ represents the resistance value of at least one of a mounting pad or an electrical trace.

$$I_1(R_1+R_{C1}+R_{X1})=I_2(R_{C2}+R_{X2}). \quad\text{EQ8:}$$

Equation 8 may be rearranged to solve for R1 in a manner similar the method described above.

Figure 5:
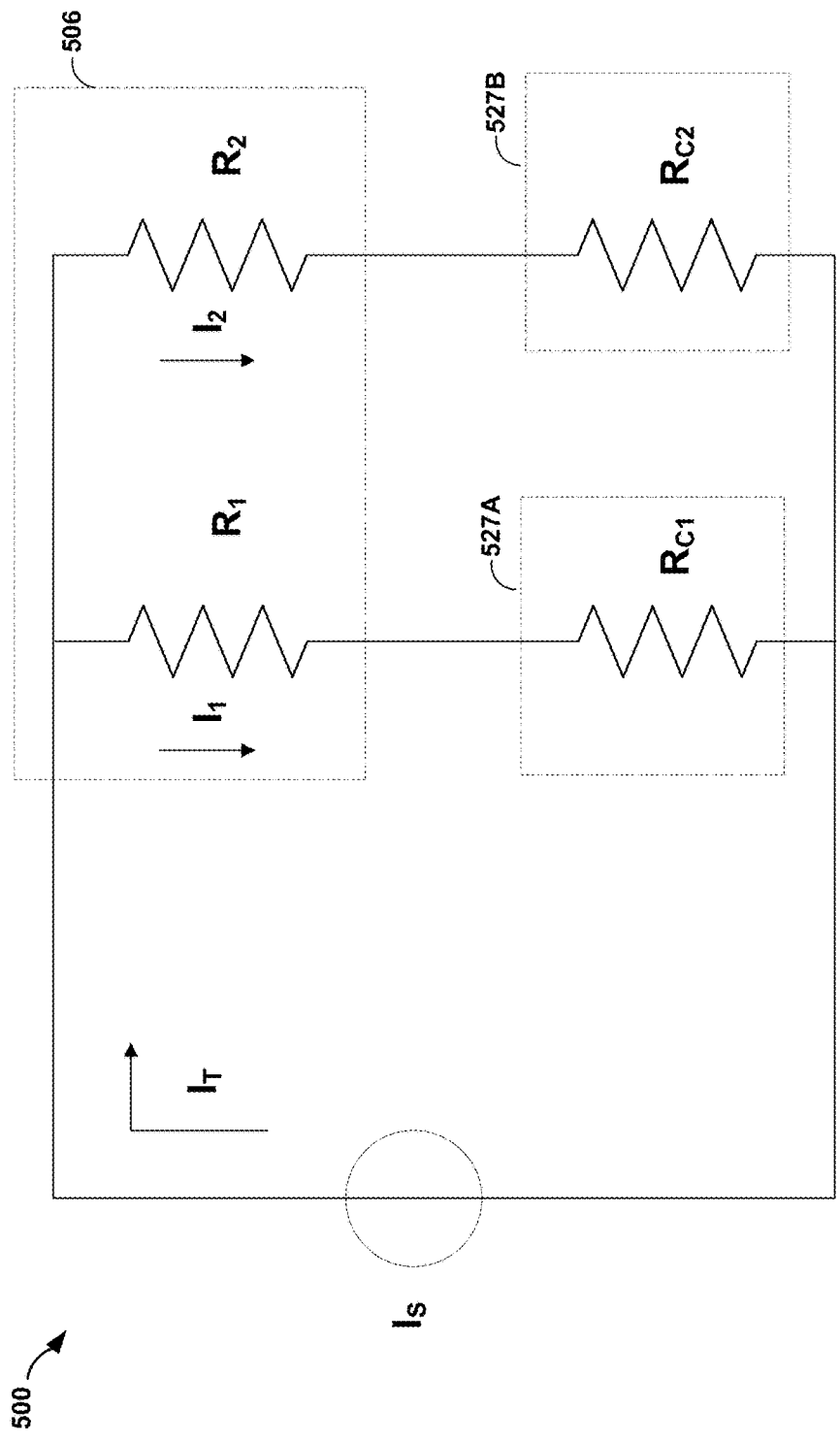
FIG. 5 is a circuit diagram illustrating an example control circuit of an example accelerometer.

FIG. 5 is a circuit diagram illustrating an example control circuit of an example accelerometer. Control circuit 500 may include current source $I_S$, splitter 506, and a first force rebalance coil 527A connected in parallel to a second force rebalance coil 527B (collectively, "force rebalance coils 527"). Splitter 506 may correspond to splitter 306 of controller 350, as shown in FIG. 3. In some examples, as illustrated in FIG. 5, splitter 506 includes a first resistor $R_1$ connected in series to first force rebalance coil 527A and a second resistor $R_2$ connected in series to second force rebalance coil 527B. First force rebalance coil 527A may include a resistance value indicated by $R_{C1}$ and second force rebalance coil 527B may include a resistance value indicated by $R_{C2}$.

Current source $I_S$ may supply a total current $I_T$ to splitter 506. Splitter 506 receives current $I_T$ from current source $I_S$ and may split the current into a first amount of current $I_1$ and a second amount of current $I_2$. For example, splitter 506 may distribute a first amount of current $I_1$ to first force rebalance coil 527A and a second amount of current $I_2$ to second force rebalance coil 527B. Splitter 506 may distribute the current to force rebalance coils 527 based on a resistance value of resistor $R_1$, a resistance value of resistor $R_2$, the resistance value $R_{C1}$ of first force rebalance coil 527A, and the resistance value $R_{C2}$ of second force rebalance coil 527B. In some examples, the resistance value of resistor $R_1$ and the resistance value of resistor $R_2$ may be based on a first minor loop slope associated with first force rebalance coil 527A and a second minor loop slope associated with second force rebalance coil 527B. For example, as illustrated by the equations below, the resistance value of resistor $R_1$ and the resistance value of resistor $R_2$ may be chosen so that the ratio of the current $I_1$ to current $I_2$ is inversely proportional to the ratio of the first minor loop slope and the second minor loop slope. For instance, the ratio of the current $I_1$ to current $I_2$ may be equal, or approximately equal, to the inverse of a ratio of the first minor loop slope to the second minor loop slope, as shown by equation 9.

$$\frac{I_1}{I_2} = \frac{MLS_2}{MLS_1}. \quad\text{EQ 9}$$

Because the voltage drop across $R_1$ and $R_{C1}$ is equal to the voltage drop across $R_2$ and $R_{C2}$, control circuit 500 may be represented by equation 10:

$$I_1(R_1+R_{C1})=I_2(R_2+R_{C2}) \quad\text{EQ10:}$$

Equation 10 can be re-written to solve for $R_1$, as shown by equation 11.

$$R_1 = \left(\frac{I_2}{I_1}(R_2 + R_{C2})\right) - R_{C1}. \qquad \text{EQ 11}$$

Substituting the ratio of the first minor loop slope to the second minor loop slope for the ratio of the current $I_1$ to current $I_2$ results in equation 12.

$$R_1 = \left(\frac{MLS_1}{MLS_2} * (R_2 + R_{C2})\right) - R_{C1}. \qquad \text{EQ 12}$$

$R_2$ may be chosen as any arbitrary resistance. Thus, for ease of illustration, $R_2$ is assumed to be 1 Ohm. Therefore, the resistance value of resistor $R_1$ may be calculated because $R_2$, $R_{C1}$ and $R_{C2}$ are known, and as discussed above with reference to FIG. 3, controller 350 may determine the minor loop slopes associated with the first permanent magnet and the second permanent magnet.

In some examples, if $R_2 = 1$ Ohm, $R_{C1} = 26$ Ohms, $R_{C2} = 26$ Ohms, and the ratio $$\frac{MLS_1}{MLS_2} = \frac{1}{0.95},$$

$R_1$ may be calculated by equation 13.

$$R_1 = \left(\frac{1}{0.95} * 27\right) - 26 \approx 2.421053 \ldots \text{Ohms.} \qquad \text{EQ 13}$$

In some examples, it may not be possible to choose a resistor with a resistance value exactly equal to the resistance value $R_1$, such that the resistance value of $R_1$ may be approximated by a resistor having a resistance value $R_1'$. For example, in some examples, $R_1$ may be approximated by a resistor $R_1'$ having a resistance value equal to 2.42 Ohms. Substituting the resistance value $R_1'$ for $R_1$ and the resistance values for $R_1'$, $R_{C1}$ and $R_{C2}$ back into Equation 10 yields equation 14.

$$\frac{I_1}{I_2} = \frac{R_2 + R_{C2}}{R_{1'} + R_{C1}} = \frac{27}{28.42}. \qquad \text{EQ 14}$$

Substituting equation 14 back into equation 9 shows that:

$$\left(\frac{I_1}{I_2} = \frac{27}{28.42} \approx 0.9500\right) \approx \left(\frac{MLS_2}{MLS_1} = \frac{0.95}{1} = 0.95\right). \qquad \text{EQ 15}$$

Thus, as shown by equation 15, by adding a first resistor $R_1'$ in series with first force rebalance coil 527A and a second resistor $R_2$ in series with second force rebalance coil 527B, the ratio of the first amount of current (which is distributed to first force rebalance coil) to the second amount of current (which is distributed to second force rebalance coil) may be equal, or approximately equal (plus or minus 0.01), to the inverse of the ratio of the first minor loop slope to the second minor loop slope. In some examples, adding second resistor $R_2$ in series with second force rebalance coil 527B may increase the resolution of the current distributed to force rebalance coils 527 compared to using only a single resistor $R_1$ (or $R_1'$) in series with first force rebalance coil 527A. By increasing the resolution of the current distributed to force rebalance coils 527, the accelerometer may more accurately determine the acceleration.

In some examples, the resistance value of resistor $R_1$ may be further based on a resistance value of at least one mounting pad 29, a resistance value of at least one electrical trace 21 or electrical trace 23, or a combination therein. For example, referring back to FIG. 1, controller 50 may be electrically coupled to upper force rebalance coil 27A via mounting pad 29B, electrical trace 21B, and electrical trace 23B. Thus, the first amount of current may flow through resistor $R_1$, mounting pad 29B, electrical trace 21B, and electrical trace 23B before reaching upper force rebalance coil 27A. Similarly, the second amount of current may flow through a mounting pad at least one electrical trace on the bottom surface of proof mass assembly 20 before reaching lower force rebalance coil 27B. Because the circuit including upper force rebalance coil 27A may be connected in parallel to the circuit including lower force rebalance coil 27B, the voltage drop across the circuits may be equal. Thus, in some examples, the voltage drop may be shown by equation 16, where $R_{X1}$ represents the resistance value of at least one of a mounting pad or an electrical trace and $R_{X2}$ represents the resistance value of at least one of a mounting pad or an electrical trace.

$$I_1(R_1 + R_{C1} + R_{X1}) = I_2(R_2 + R_{C2} + R_{X2}). \qquad \text{EQ16:}$$

Equation 16 may be rearranged to solve for R1 in a manner similar the method described above.

Figure 6:
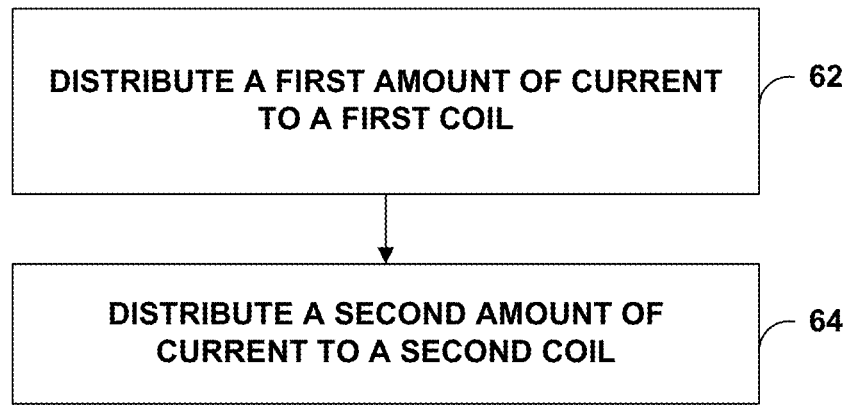
FIG. 6 is a flow chart illustrating an example technique for operating an accelerometer in accordance with the disclosure.

FIG. 6 is a flow chart illustrating an example technique for operating an accelerometer in accordance with the disclosure. For ease of illustration, the exemplary technique of FIG. 6 will be described with concurrent reference to accelerometer 2 of FIG. 1. However, the techniques may be used with any accelerometer.

In some examples, controller 50 may distribute a first amount of current to a first coil (62) and distribute a second amount of current to a second coil (64). For example, controller 50 may distribute the first amount of current to an upper force rebalance coil and a second, different amount of current to a lower force rebalance coil. For instance, if the minor loop slope associated with upper permanent magnet 14 is greater than the minor loop slope associated with lower permanent magnet 34, this may indicate that less current may be used to cause upper permanent magnet 14 to generate a certain amount of change in magnetic flux relative to the amount of current used to cause lower permanent magnet 34 to generate the same magnitude of change in magnetic flux. Thus, if the minor loop slope associated with upper permanent magnet 14 is greater than the minor loop slope associated with lower permanent magnet 34, controller 50 may include a resistor coupled in series to upper force rebalance coil 27A and may distribute a first amount of current to upper force rebalance coil 27A and a second, larger amount of current to lower force rebalance coil 27B. Similarly, if the minor loop slope associated with upper permanent magnet 14 is less than the minor loop slope associated with lower permanent magnet 34, controller 50 may include a resistor coupled in series to lower force rebalance coil 27B and may distribute a first amount of current to upper force rebalance coil 27A and a second, smaller amount of current to lower force rebalance coil 27B.

The techniques of this disclosure may be implemented using hardware, software, firmware, any combination thereof, or other suitable devices. If implemented using software, the techniques may be programmed and stored on or transmitted over, as one or more instructions or code, a computer-readable medium and executed by a hardware-based processing units configured to perform the various techniques described above. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Instructions to perform the various techniques described above may be executed in some examples by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. The techniques of this disclosure also may be implemented in a wide variety of other suitable devices or apparatuses.

The techniques of this disclosure may be implemented in a wide variety of computer devices including as part of an integrated circuit (IC) or a set of ICs (e.g., a chip set). Any components, modules or units that have been described here are provided to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Moreover, components that have been described above as being separate or discrete may in fact be highly integrated.

Various examples have been described. These and other examples are within the scope of the following claims.

The invention claimed is:

1. An accelerometer comprising:
a first stator comprising a first magnet;
a second stator comprising a second magnet;
a proof mass assembly disposed between the first stator and the second stator, the proof mass assembly comprising:
a first coil configured to receive a first amount of current; and
a second coil configured to receive a second, different amount of current; and a controller comprising a resistor coupled in series to the first coil, wherein the controller is configured to distribute the first amount of current to the first coil and the second, different amount of current to the second coil, wherein the first amount of current distributed to the first coil is based at least in part on a resistance value of the resistor, and wherein the resistance value of the resistor is based at least in part on a resistance value of the first coil, a resistance value of the second coil, and a ratio of a first minor loop slope associated with the first magnet to a second minor loop slope associated with the second magnet.

2. The accelerometer of claim 1, wherein the resistance value of the resistor is further based on a resistance value of at least one of an electrical trace or mounting pad.

3. The accelerometer of claim 1, wherein:
the resistor is a first resistor,
the controller further comprises a second resistor electrically coupled in series to the second coil,
the resistance value of the first resistor is further based on a resistance value of the second resistor.

4. The accelerometer of claim 1, wherein the controller is further configured to:
determine the first minor loop slope associated with the first magnet; and
determine the second minor loop slope associated with the second magnet,
wherein a ratio of the first amount of current to the second, different amount of current is inversely proportional to the ratio of the first minor loop slope associated with the first magnet to the second minor loop slope associated with the second magnet.

5. The accelerometer of claim 4, wherein:
the first amount of current is greater than the second, different amount of current if the first minor loop slope associated with the first magnet is less than the second minor loop slope associated with the second magnet, and
the first amount of current is less than the second, different amount of current if the first minor loop slope associated with the first magnet is greater than the second minor loop slope associated with the second magnet.

6. The accelerometer of claim 4, wherein:
the controller is configured to determine the first minor loop slope associated with the first magnet by being configured to:
distribute, while the accelerometer experiences a first acceleration, a third amount of current to the first coil;
receive an output current generated by a first capacitance pick-off plate; and
determine the first minor loop slope associated with the first magnet by comparing the third amount of current to the output current generated by the first capacitance pick-off plate; and
the controller is configured to determine the second minor loop slope associated with the second magnet by being configured to:
distribute, while the accelerometer experiences a second acceleration, a fourth amount of current to the second coil;
receive an output current generated by the second capacitance pick-off plate; and
determine the second minor loop slope associated with the second magnet by comparing the fourth amount of current to the output current generated by the second capacitance pick-off plate.

7. The accelerometer of claim 6, wherein:
the controller comprises a switch,
the controller is configured to distribute the third amount of current to the first coil by being configured to toggle the switch from a first position to a second position to couple the switch to the first coil and decouple the switch from the second coil, and
the controller is configured to distribute the fourth amount of current to the second coil by being configured to toggle the switch from the first position to the second position to couple the switch to the second coil and decouple the switch from the first coil.

8. The accelerometer of claim 6, wherein:
the controller comprises a switching device comprising a first switch and a second switch,
the controller is configured to distribute the third amount of current to the first coil by being configured to:
couple the switching device to the first coil by closing the first switch; and
decouple the switching device from the second coil by opening the second switch,
and
the controller is configured to distribute the fourth amount of current to the second coil by being configured to:
decouple the switching device from the first coil by opening the first switch; and
couple the switching device to the second coil by closing the second switch.

9. A method comprising:
distributing, by a controller of an accelerometer, a first amount of current to a first coil and a resistor coupled in series to the first coil; and
distributing, by the controller, a second, different amount of current to a second coil,
wherein a first stator of the accelerometer comprises a first magnet,
wherein a second stator of the accelerometer comprises a second magnet,
wherein a proof mass assembly of the accelerometer is disposed between the first stator and second stator and comprises the first coil and the second coil, and
wherein the first amount of current is based at least in part on a resistance value of the resistor and the resistance value of the resistor is based at least in part on a resistance value of the first coil, a resistance value of the second coil, and a ratio of a first minor loop slope associated with the first magnet to a second minor loop slope associated with the second magnet.

10. The method of claim 9, wherein the resistance value of the resistor is further based on a resistance value of at least one of an electrical trace or mounting pad.

11. The method of claim 9, wherein the resistor is a first resistor, and wherein distributing the second, different amount of current to the second coil comprises:
distributing, by the controller, the second, different amount of current to a second resistor coupled in series to the second coil,
wherein the resistance value of the first resistor is further based on a resistance value of the second resistor.

12. The method of claim 9, further comprising:
determining, by the controller, the first minor loop slope associated with the first magnet; and
determining, by the controller, the second minor loop slope associated with the second magnet,
wherein the ratio of the first amount of current to the second, different amount of current is inversely proportional to the ratio of the first minor loop slope associated with the first magnet to the second minor loop slope associated with the second magnet.

13. The method of claim 12, wherein:
the first amount of current is greater than the second, different amount of current if the first minor loop slope associated with the first magnet is less than the second minor loop slope associated with the second magnet, and
the first amount of current is less than the second, different amount of current if the first minor loop slope associated with the first magnet is greater than the second minor loop slope associated with the second magnet.

14. The method of claim 12, wherein:
determining the first minor loop slope comprises:
distributing, by the controller and while the accelerometer experiences a first acceleration, a third amount of current to the first coil;
receiving, by the controller, an output current generated by a first capacitance pick-off plate; and
determining, by the controller, the first minor loop slope associated with the first magnet by comparing the third amount of current to the output current generated by the first capacitance pick-off plate; and
determining the second minor loop slope comprises:
distributing, by the controller and while the accelerometer experiences a second acceleration, a fourth amount of current to the second coil;
receiving, by the controller, an output current generated by a second capacitance pick-off plate; and
determining, by the controller, the second minor loop slope associated with the second magnet by comparing the fourth amount of current to the output current generated by the second capacitance pick-off plate.

15. The method of claim 14, wherein:
distributing the third amount of current to the first coil comprises toggling, by the controller, a switch from a first position to a second position to couple the switch to the first coil and decouple the switch from the second coil, and
distributing the fourth amount of current to the second coil comprises toggling, by the controller, the switch from the first position to the second position to couple the switch to the second coil and decouple the switch from the first coil.

16. The method of claim 14, wherein:
distributing the third amount of current to the first coil comprises:
coupling, by the controller, a switching device comprising a first switch and a second switch to the first coil by closing the first switch; and
decoupling, by the controller, the switching device from the second coil by opening the second switch; and
distributing the fourth amount of current to the second coil comprises:
decoupling, by the controller, the switching device from the first coil by opening the first switch; and
coupling, by the controller, the switching device to the second coil by closing the second switch.

17. A method comprising:
determining a first minor loop slope associated with a first magnet of a first stator of an accelerometer,
determining a second minor loop slope associated with a second magnet of a second stator of the accelerometer; and distributing, by a controller of the accelerometer, a first amount of current to a first coil of a proof mass assembly disposed between the first stator and second stator, distributing, by the controller, a second, different amount of current to a second coil, wherein a ratio of the first amount of current to the second, different amount of current is inversely proportional to the ratio of the first minor loop slope associated with the first magnet to the second minor loop slope associated with the second magnet.

18. The method of claim 17, wherein determining the first minor loop slope comprises:
  distributing, by the controller and while the accelerometer experiences a first acceleration, a third amount of current to the first coil;
  receiving, by the controller, an output current generated by a first capacitance pick-off plate; and
  determining the first minor loop slope associated with the first magnet by comparing the third amount of current to the output current generated by the first capacitance pick-off plate; and wherein determining the second minor loop slope comprises:
  distributing, by the controller and while the accelerometer experiences a second acceleration, a fourth amount of current to the second coil;
  receiving, by the controller, an output current generated by a second capacitance pick-off plate; and
  determining the second minor loop slope associated with the second magnet by comparing the fourth amount of current to the output current generated by the second capacitance pick-off plate.

19. The method of claim 18, wherein:

distributing the third amount of current to the first coil comprises toggling, by the controller, a switch from a first position to a second position to couple the switch to the first coil and decouple the switch from the second coil, and distributing the fourth amount of current to the second coil comprises toggling, by the controller, the switch from the first position to the second position to couple the switch to the second coil and decouple the switch from the first coil.

20. The method of claim 18, wherein:

distributing the third amount of current to the first coil comprises:
  coupling, by the controller, a switching device comprising a first switch and a second switch to the first coil by closing the first switch; and
  decoupling, by the controller, the switching device from the second coil by opening the second switch; and distributing the fourth amount of current to the second coil comprises:
  decoupling, by the controller, the switching device from the first coil by opening the first switch; and
  coupling, by the controller, the switching device to the second coil by closing the second switch.

* * * * *